United States Patent [11] 3,615,445

[72] Inventor Alice Elizabeth Powell
445 W. 49th St. Apt. 2A, New York, N.Y. 10019

[21] Appl. No. 656,468
[22] Filed July 27, 1967
[45] Patented Oct. 26, 1971

[54] METHOD OF CORRECTING OFFSET PRINTING PLATES
1 Claim, 2 Drawing Figs.

[52] U.S. Cl. ........................................................ 96/33, 252/143
[51] Int. Cl. ........................................................ G03c 7/02, C11d 7/08
[50] Field of Search ............................................ 96/33; 117/2

[56] References Cited

UNITED STATES PATENTS 2,772,942 12/1956 Mattare ........................ 96/33

OTHER REFERENCES

Clark, Modern Lithography, Dec. 1950, pp. 40–41
Cartwright, Ilford Graphics Art Manual, Vol. I, pp. 383, 384 & 385

*Primary Examiner*—Norman G. Torchin
*Assistant Examiner*—Alfonso T. Suro Pico
*Attorney*—Polachek and Saulsbury

ABSTRACT: The disclosure describes a method of correcting an offset printing plate after it is completed and mounted on a printing press. The plate can be corrected by adding or removing copy impressions in selected areas.

INVENTOR
Alice Elizabeth Powell
BY Polachek & Saulsbury
ATTORNEYS

METHOD OF CORRECTING OFFSET PRINTING PLATES

This invention is directed to salvaging and/or correcting offset printing plates.

The invention is particularly directed at at spot or area correction of an offset plate.

Offset, planographic or lithographic printing plates are typically metal sheet structures on which a photosensitive coating, usually a diazocompound, is exposed to light through a negative transparency, causing the light sensitized material to harden, thereby becoming insoluble in a desensitizing solution which is applied to the plate after the light exposure for the purpose of removing that part of the light-sensitive coating which, because it was protected from light by the negative film, was not lighthardened. The light-hardened surface areas of a negative plate thus formed will be oleophilic so that they are compatible with the greasy printing ink thereafter applied. These surface areas are called the image areas bearing copy impressions. The surface areas from which the nonhardened light-sensitive material has been removed with desensitizer will be hydrophilic and oleophobic so that they do not take up the greasy printing ink.

When such a printing plate has been completed and set up for work in a printing press, it is often found that some correction may be necessary. This may involve removal of certain copy impressions, addition of new copy impressions, or change of certain copy impressions in some way. Heretofore the most practical way of handling the situation has been to prepare a new printing plate and to discard the plate needing correction, because there was no way of economically correcting the old plate. This situation has proven highly objectionable in practice because it meant that the printing operations were held up until a new plate was prepared. Also the cost and labor expended in preparing the old plate needing correction was lost.

The present invention provides a method of solving this situation in a quick, easy and economical way, without having to prepare a new substitute plate for one needing correction.

SUMMARY OF INVENTION

The objects of the invention are to provide a method capable of making the following types of repairs and corrections, among others, to offset printing plate:

1. Repair worn copy impression areas after the plate has been in use for some time. 2. Replace one image or copy impression with another. 3. Correct faulty impressions, where one color does not register with another one. 4. Correct paper stretch gaps. 5. Change imprints. 6. Correct broken solid areas. 7. Add new copy impressions to the plate where no copy impressions are present. 8. Remove undesired copy impressions from the plate.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIG. 1 shows an offset printing plate on a cylinder of a printing press at various stages of the copy correction method. FIG. 2 is a flow chart of steps of the method according to the invention.

DETAILED DESCRIPTION

Figure 1:
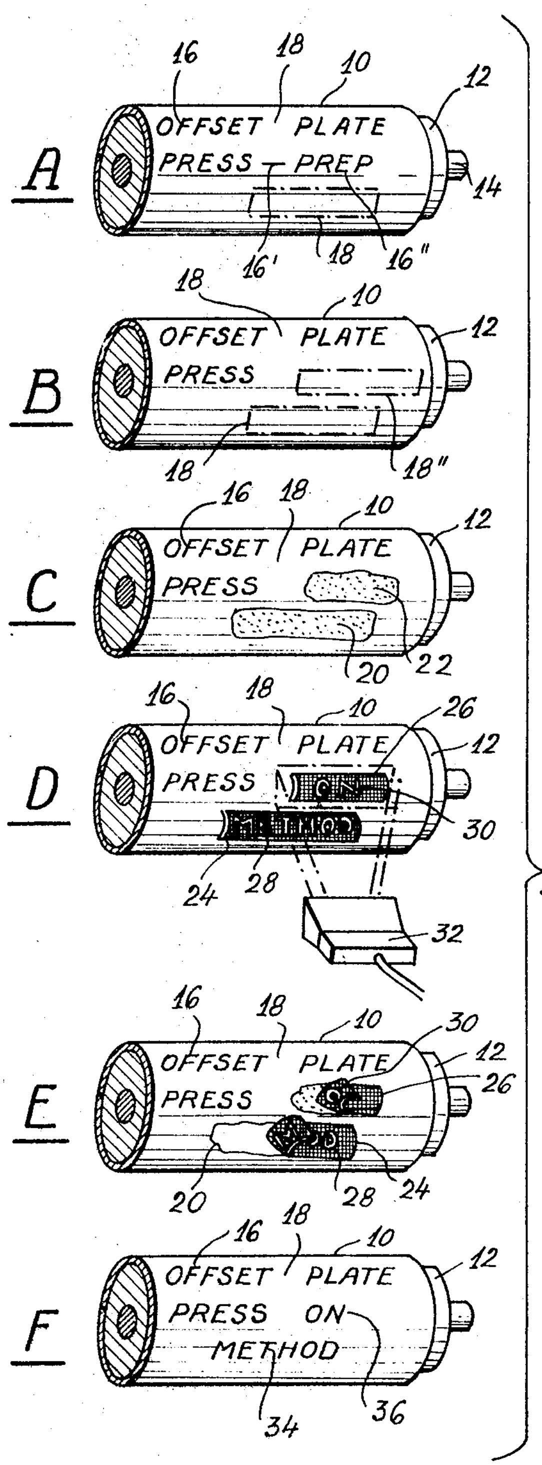

Referring to FIG. 1, there is shown at all stages A–F an offset printing plate of metal 10 mounted on a cylinder 12 of a printing press in position for printing. The cylinder is rotatably carried by an axial shaft 14 in the press.

Figure 2:
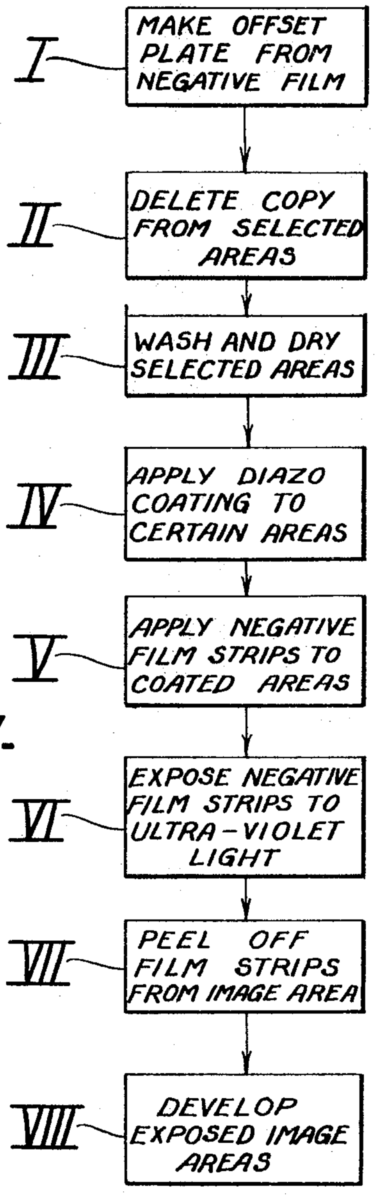

FIG. 2 indicates steps I–VIII of the method. In the first step I, the offset plate 10 shown at stage A of FIG. 1 is made. This is done by using a negative film so that a positive copy impression 16 results on the plate. As indicated above, this copy impression constitutes light-hardened areas which are oleophilic while the remaining areas 18 are hydrophilic and oleophobic.

Suppose it is now desired to correct plate 10 by (1) deleting the hyphen 16', by (2) changing the word 16'' to some other word, and by (3) adding a further word to the hydrophilic area 18'. Step II indicated in FIG. 2 involves removing image areas 16' and 16'' by a suitable solvent, and this solvent may be of known type such as described in U.S. Pat. No. 3,248,332. Stage B of FIG. 1 shows that images 16' and 16'' have been removed leaving clear area 18''. This area is now washed and dried as indicated in step III. In step IV light sensitive diazocoatings 20, 22 are applied to areas 18' and 18'' as indicated in stage C of FIG. 1, and these coatings are then air dried. New photographic negative film strips 24 and 26 are now prepared by conventional photographic methods. These strips have transparent areas 28, 30 corresponding to the new images to be added to the plate 10. The strips are first coated with a transparent film cement applied to the developed photographic emulsion side of the strips and the strips are then pressed on coatings 20, 22 on plate 10 in step V. At stage D the strips are shown attached to plate 10.

In step VI, the negative film strips are exposed to spot light from ultraviolet lamp 32. The light is locally applied only to the areas where new copy impressions are to be made. Stage D shows the lamp 32 illuminating strip 26. After exposure, the film strips 24 and 26 are peeled off as indicated at stage E and step VII. This leaves the diazocoatings 20, 22 with latent light-hardened images thereon. The images are then developed by use of conventional diazo-image developing fluids applied only to the coatings as indicated by step VIII. The parts of the coating which were not light-hardened dissolve off leaving new copy impressions 34,36 corresponding to the images 28, 30 on the film strips, indicated at stage F. The plate is now ready to use in printing.

In the present invention it will be noted that at no time was it necessary to remove the plate 10 from the cylinder 12. At all times the plate 10 remained in position on the cylinder for printing. Only selected areas of the plate 10 were affected by the correction procedure. The useful life of the plate has been extended by the correction procedure to which it has been subjected.

While I have illustrated and described the preferred embodiments of my invention, it is to be understood that I do not limit myself to the precise construction herein disclosed and that various changes and modifications may be made within the scope of the invention as defined in the appended claims.

I claim:

1. A method of correcting an offset printing plate having a light-hardened and developed oleophilic image on a certain area thereof, said area being surrounded by hydrophilic areas, comprising the steps of applying a diazo-image-removing solvent to a selected portion of an oleophilic image on a surface of a mounted cylindrical offset printing plate sufficiently to remove said image portion and sufficiently to render said solvent-applied surface hydrophilic, applying a light sensitive coating comprising substantially diazo compound to said solvent-applied surface, said diazocompound being hardenable by exposure to ultraviolet light to an oleophilic surface, drying said coating, applying a transparent film-cement to a negative film strip's side containing developed photographic emulsion, adhering said cement-applied strip's side to said dried coating, said filmstrip having transparent portions defining a new image, illuminating said film to ultraviolet light by a spot light on said transparent portions sufficiently to form a light-hardened latent image in said dried coating, removing thereafter the filmstrip, and applying diazo-image developing-fluid sufficiently to develop the light-hardened latent image to an oleophilic impression suitable for offset printing and sufficiently to dissolve-off unexposed portions of said dried coating.